Dec. 25, 1928.

T. W. PRICE 1,696,412

CEILING BED

Filed June 18, 1926    8 Sheets-Sheet 1

INVENTOR
Thornton W. Price
BY
ATTORNEY

Dec. 25, 1928.  1,696,412

T. W. PRICE

CEILING BED

Filed June 18, 1926  8 Sheets-Sheet 2

Dec. 25, 1928.

T. W. PRICE

CEILING BED

Filed June 18, 1926      8 Sheets-Sheet 8

INVENTOR
Thornton W. Price
BY
ATTORNEY

Patented Dec. 25, 1928.

1,696,412

UNITED STATES PATENT OFFICE.

THORNTON W. PRICE, OF NEW BRUNSWICK, NEW JERSEY.

CEILING BED.

Application filed June 18, 1926. Serial No. 116,913.

This invention relates to a ceiling bed structure, that is to a structure comprising a bed which when not in use may be readily lifted and disposed of at the ceiling of the room so as thus to leave unobstructed for other use the space previously occupied in the room by the bed.

An object of the invention is to provide a bed structure of the type indicated and in which the operation of moving the bed between its lower position of use and its upper, or non-use, position is accomplished by simple, substantial and efficient mechanism.

A further object is to provide suitable safety guard means to prevent possibility of the bed moving from one position to another except when purposely manually manipulated to that effect.

A further object is to provide safety means to prevent the falling of the bed, or of its counter-weight in the event of breakage of their connecting medium.

A further object is to provide an improved hoisting mechanism by which to move the bed from one position to another.

A further object is to so arrange the parts of the structure as to embody therein a novel form of cabinet providing guideways for the bed and its counter-weight and also providing storage space for articles of wearing apparel and the like.

A further object is to provide novel and attractive features of construction in the cabinet portion of the device.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention:—

Referring now to the drawings for a detail description of the exemplary structure illustrated therein, the reference character L indicates the cabinet portion of the bed structure comprising this invention, while the reference character G indicates the bed portion proper.

The cabinet is constructed to provide a pair of standards 1 and 2 arranged at opposite sides of the front portion of the cabinet each intended to extend substantially from floor to ceiling and being parallel with each other. These standards constitute the direct support and guide for the bed proper G.

In the instance illustrated the standards are each of channel cross section arranged with their flanges projecting away from each other. To the front flange of each of these standards is connected a panel member 3 at the outer edge of each of which is a corner angle 4. These panel members and corner angles provide an attractive appearance for the opposite marginal parts of the front of the cabinet and incidentally materially reinforce the standards.

Intermediate the standards 1 and 2, and spaced from said standards respectively, are a pair of further corner angles 5 and 6. The space intermediate these angles is occupied by a pair of sliding doors as 7 and 8 mounted upon guideways 9 and 10 respectively, said doors being movable in overlapping paths so that either thereof may be slid to position besides the other for thereby giving access to the space within the cabinet.

From the angle 5 suitable wall members 11, 12 and 13 extend to the panel member 3 and define a run-way 14 parallel with the standard 1 and opening outwardly through the slot 15 which occurs between said standard and the angle 5.

From the angle 6 suitable wall members 16, 17 and 18 extend to the angle 4 and define a run-way 19 parallel with the standard 2 and opening outwardly through the slot 20 which occurs between said standard 2 and the angle 6.

Rearwardly of the angle 4 are a pair of corner angles 21 and 22. The space between the angles 4 and 21 is shown as closed by a plurality of doors, drawers, etc., as indicated by the reference character 23 constituting one side wall of the cabinet, while the space between the angles 4 and 22 is shown as closed by a side wall member 24 of which the wall portion 18 is a part.

At the back of the cabinet is provided a rear wall 25 extending between and fixed to the angles 21 and 22 but being preferably disposed to define a recess within which is adapted to slide the bed counter-weight as H.

A central partition as 26 may be provided within the cabinet for dividing it into two halves or compartments, one of which, as 27, may be unobstructed throughout its height and used as a cupboard or closet within which to hang various articles such as wearing apparel or the like, or this space may be furnished with one or more shelves as 28, or otherwise as preferred.

The opposite compartment, as 29, may be fitted with a series of drawers as 30—30 opening forwardly and accessible by sliding aside the doors 7—8. Above this chest of drawers may be arranged a shelf as 31 usable in the same manner as the top of an ordinary bureau, chiffonier, or the like, and above this shelf may if desired be arranged a mirror as 32. And above the mirror may be provided a further shelf as 33 upon which articles may be laid or stored.

In order that the mirror may normally stand at the rear of the shelf 31 and yet be readily moved forward to a position of more convenient use it is shown as mounted upon a carrier 34 which is in turn carried by a toggle device 35 connected with a rear member as 36 of the cabinet.

The mirror has pivotal connection, by its lower edge as at 37, with the carrier 34 and is furnished with retaining means, as the slotted guide plate 38 and clamp screw 39, by which it may be held in any inclined position within the limits of the retaining device.

The compartment 29 may be fitted with additional features accessible from the side of the cabinet, as for instance it may contain a chest of small drawers as 40—40, and a small side cabinet with door as 41. It may have a door as 42 mounted to swing upon hinges as 43 to a horizontal position for use as a dressing or writing table. A mirror as 44 may be mounted to slide in ways as 45—45 so that when it is desired to use the door 42 as a dressing table the mirror may be lowered to a desirable level for use in association with the table, while when it is desired to use the door as a writing desk the mirror may be slid upwardly to expose a suitable arrangement of pigeon holes or other writing desk features as 46.

Above the mirror 44 may be arranged additional storage shelves as 47 and 48 protected by doors or otherwise as may be desired.

The bed G consists of opposite side members as 49 and 50 and opposite end members as 51 and 52, and being connected together to form a rectangular frame as is customary for bed construction.

All joints of metal parts in the bed, as well as in the cabinet structure, wherever practical are formed by welding rather than by riveting or other means.

The side members 49 and 50 are each formed of a body plate 51' which extends throughout its length and has its upper longitudinal edge curled inwardly about a reinforcing rod 52' so that it is securely fastened to said rod and thereby provides an efficient tension element extending along the upper edge of each member. Extending along the lower edge of each member is an angle piece 53 also projecting inwardly and constituting an efficient compression element as will be presently referred to.

These side members project beyond the head end member 51 and have upstanding extensions 54 at their ends, each carrying a roller as 55 disposed to roll along the inner surface 56 of the inner flange of the standards 1 and 2. Upon each of the extensions 54 is also carried a guide roller 57 which is provided with a flange 58 disposed to co-operate with a flange 59 of the roller 55 to straddle the opposite edges of the inner flange of the standard and thereby positively guide the roller 55 with respect to said flange.

Projecting downwardly from the side members 49 and 50 are other extensions as 60—60 carrying rollers 61—61 disposed to bear against and roll along the forward faces of the forward flange of the standards 1 and 2, these extensions being preferably reinforced by angle brackets or the like as 62 which extend from the lower ends of the extensions diagonally upwardly into engagement with the side members at points spaced from the head end member 51.

The head end member 51 is shown as consisting of cross plates 63—64 which extend across the space between the two side members and project both above and below the horizontal plane of said side members, the plate 63 being provided with a reinforcing marginal angle flange 65 as a finish therefor to constitute the "head board" of the bed, and the plate 64 having its opposite ends connected with the extension 60 to reinforce said extensions and having its lower longitudinal edge turned backwardly to provide a flange 66 to which is connected a cross member 67, as by means of connecting angles 68—68, said flange and cross member collectively providing a suitable point of attachment for the control cable or chain 69 by which the bed is operated as will be presently fully described.

Two further cross members 70 and 71 extend between the side members 49 and 50 adjacent to the head and foot end members respectively, these cross members serving as the immediate supports for a bed spring structure 72, and it is noted in this connection that the cross members 70 and 71 are located relatively near to the upper edge of the side members 49 and 50 and that the bed spring structure includes a series of tension springs as 73—73 exerting a constant tendency to pull said cross members toward each other. On the other hand the relationship of the side members 49 and 50 to the rollers 55 and 61 and to the angle brackets 62 is such that the weight of the foot end of the bed imparts a tension strain on the upper edge portions of the side members and a compression strain on the lower edges of said side members. The pull of the springs 73 acts constantly in opposition to the tensional strain on the upper edge portions of the side members so that a considerable proportion of said tensional strain is counteracted and absorbed making it therefore possible to use a relatively lighter side member than would otherwise be required to withstand a given weight of the foot portion of the bed. And it is particularly noticeable in this connection that any weight applied upon the spring device 72, as for instance the weight of a mattress or a person lying on the bed, will stretch the springs 73 and thereby increase their pull in counteracting the additional strain applied upon the tension element or upper edge portion of the side members.

Figure 1:
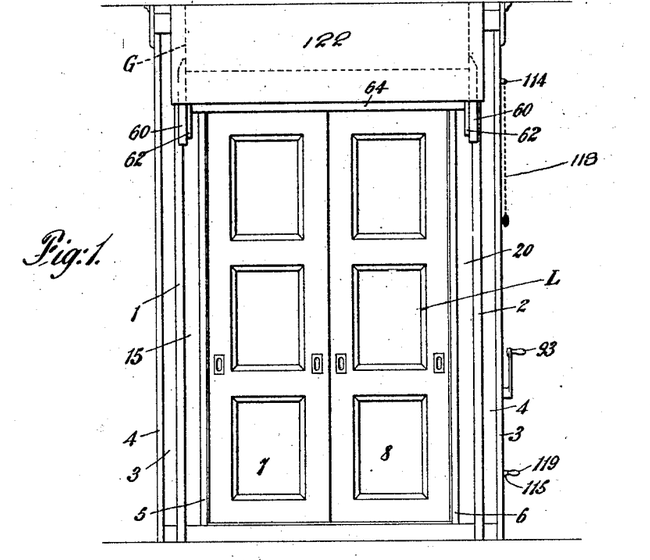
Fig. 1 is a front elevational view of a device constructed in accordance with this invention, the bed proper thereof being shown by dotted lines in its upper or concealed position.
Figure 2:
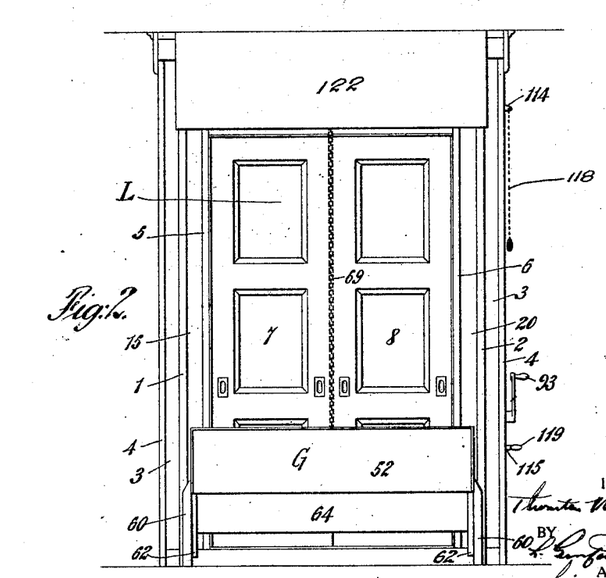
Fig. 2 is a similar view with the bed proper shown in its lowered position of use.
Figure 3:
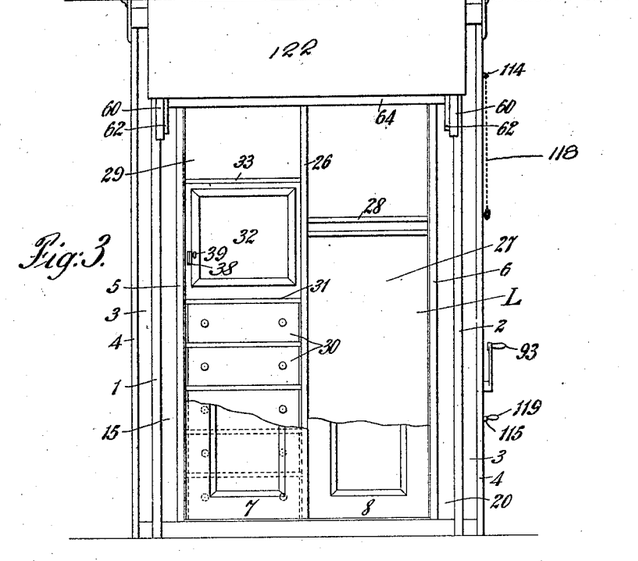
Fig. 3 is a view similar to Fig. 1 but illustrating the front doors of the cabinet as being broken away to disclose features of the interior arrangement of the cabinet.
Figure 4:
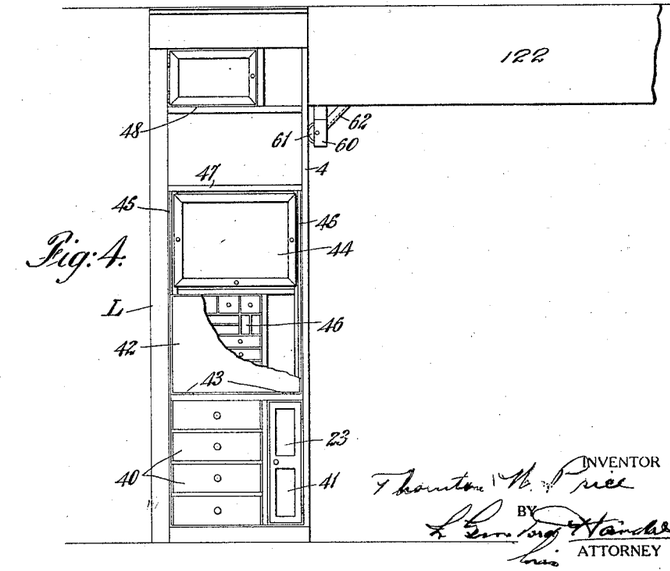
Fig. 4 is a side elevational view of the structure appearing in Fig. 3, a part of the side of the cabinet being broken away so as to disclose features of the interior arrangement of the cabinet.
Figure 5:
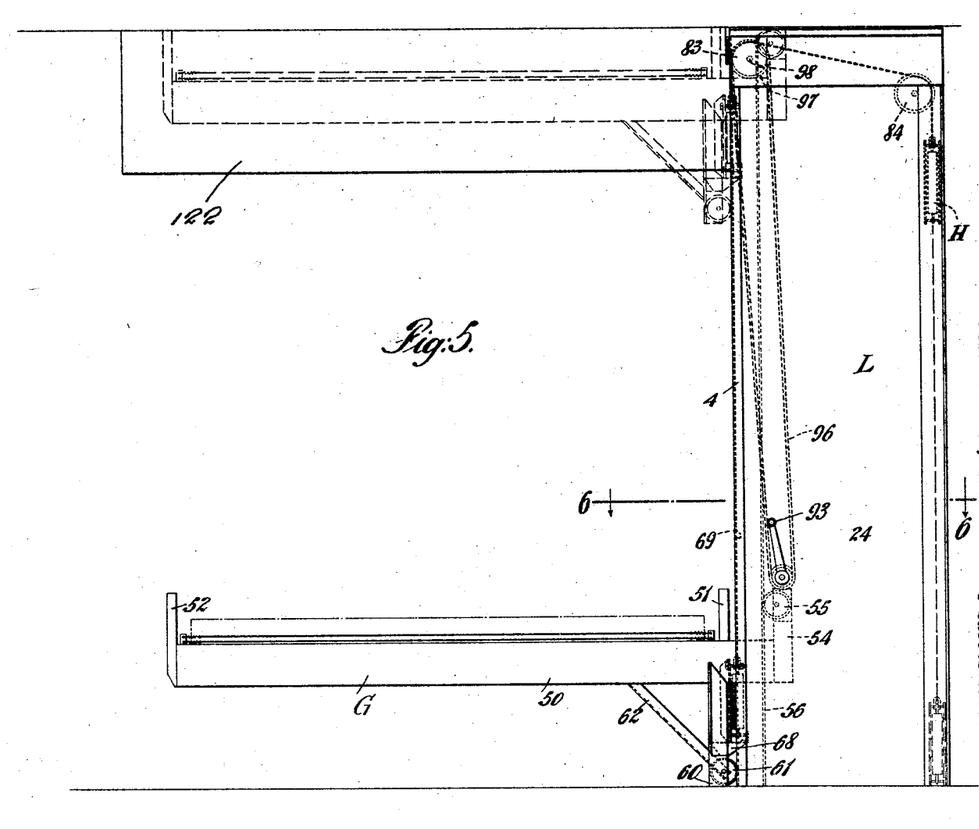
Fig. 5 is a view similar to Fig. 4 but being on an enlarged scale and taken from the opposite side of the cabinet, the bed proper in this instance being shown by full lines in its lower position and by dotted lines in its upper position, and the control mechanism being indicated in dotted lines.
Figure 6:
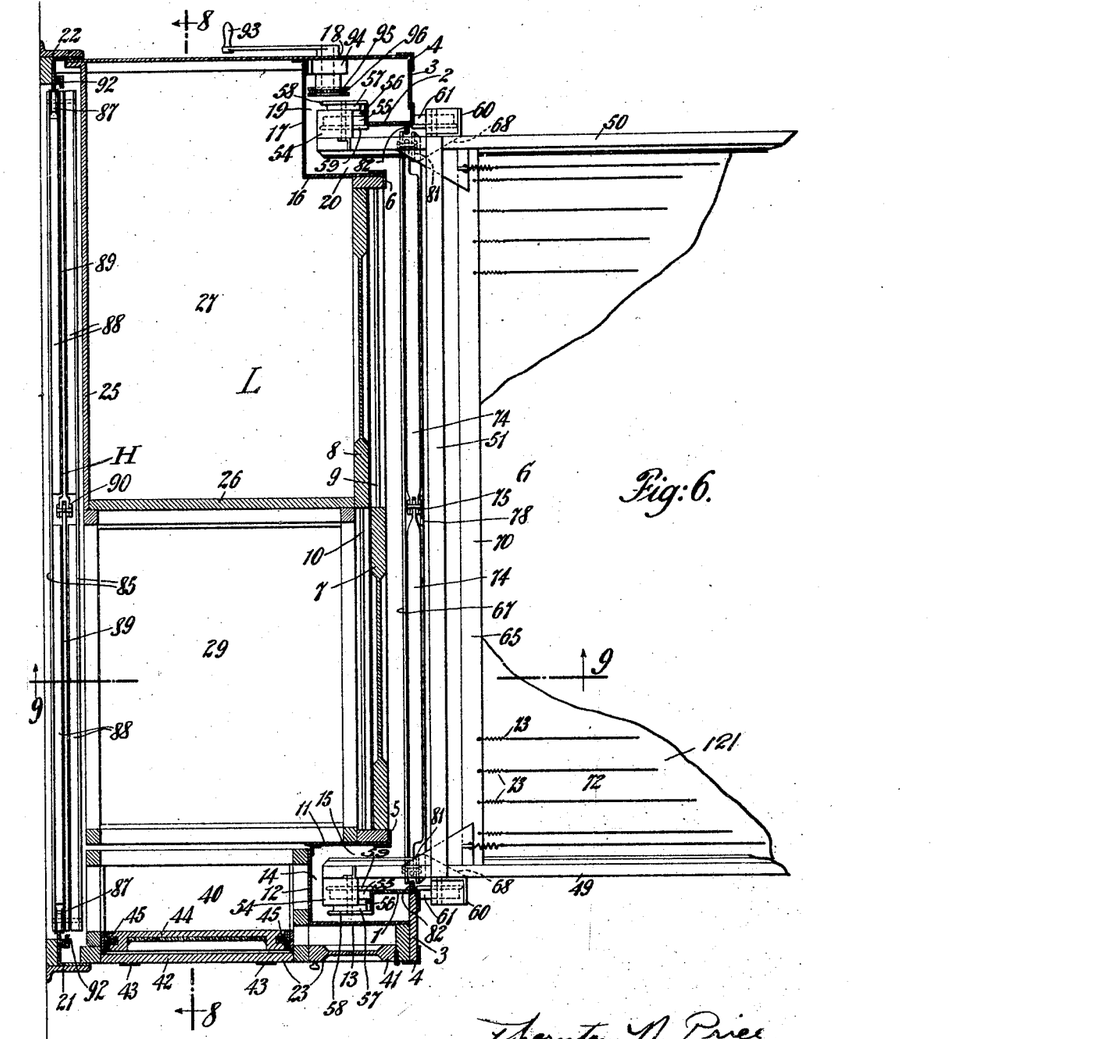
Fig. 6 is an enlarged horizontal sectional view taken substantially upon the plane of line VI—VI of Fig. 5.
Figure 7:
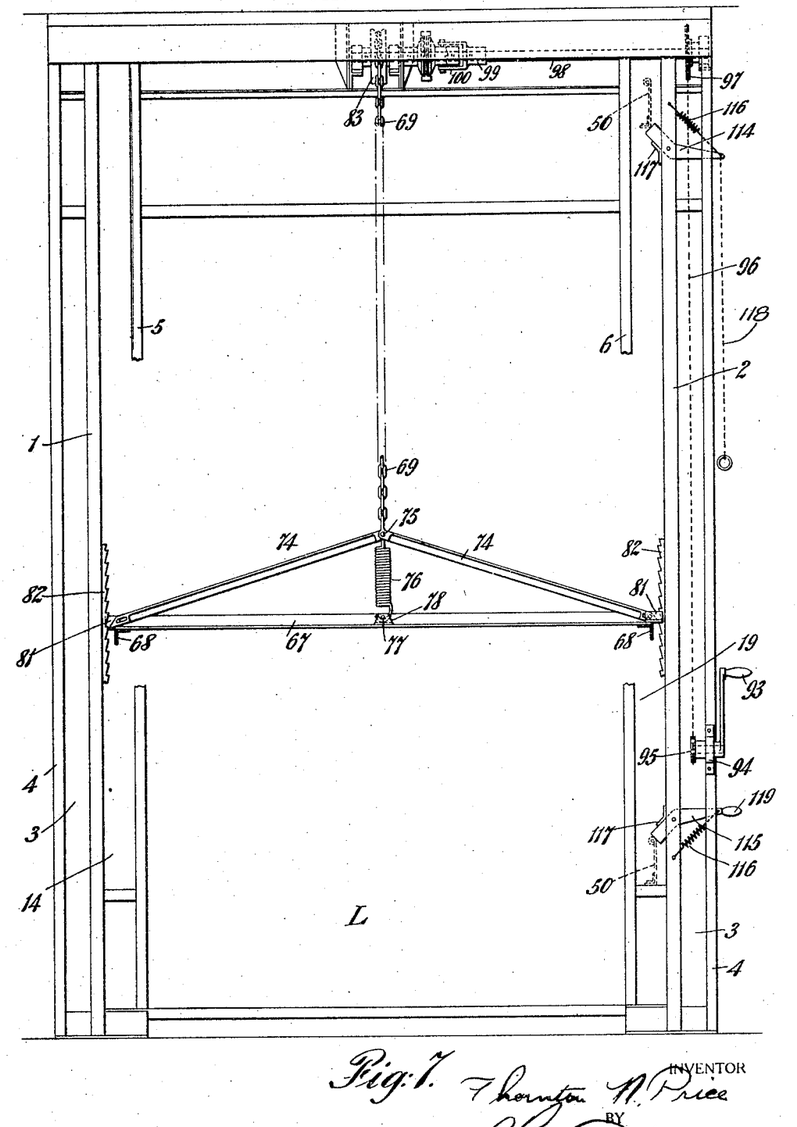
Fig. 7 is an enlarged front elevational view illustrating certain of the safety features which are embodied in the structure.
Figure 8:
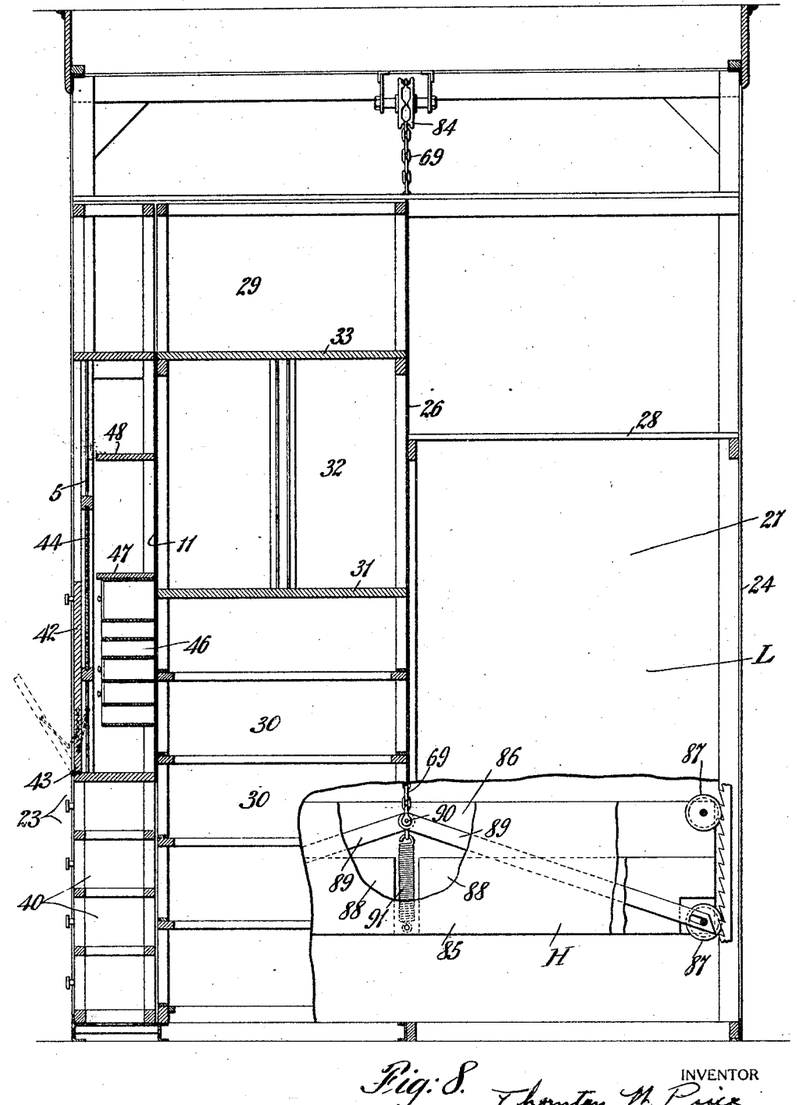
Fig. 8 is a vertical sectional view taken substantially upon the plane of line VIII—VIII of Fig. 6 and parts being broken away to show the construction and arrangement of the bed counter-weight.
Figure 9:
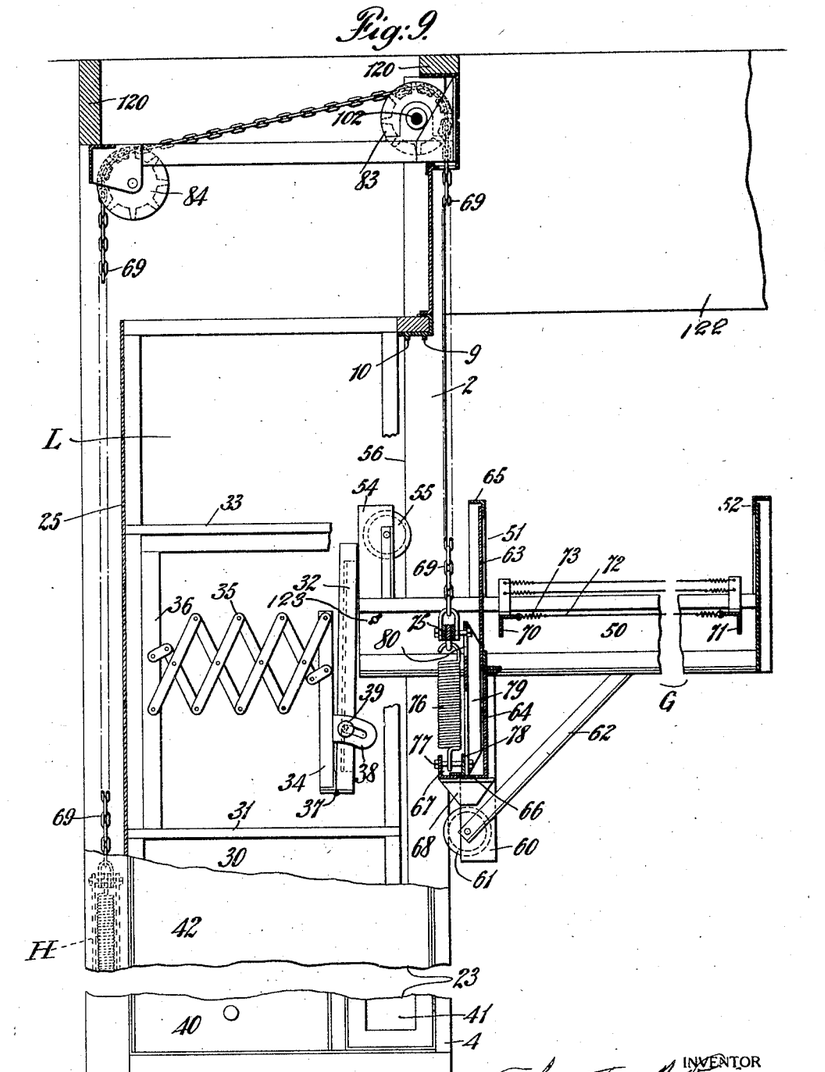
Fig. 9 is an enlarged detail sectional view taken substantially upon the plane of line IX—IX of Fig. 6 illustrating structural features of the bed and cabinet.
Figure 10:
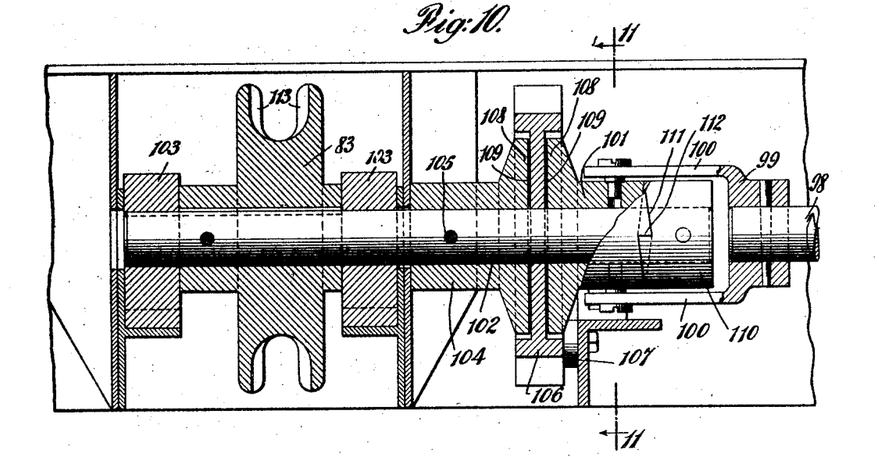
Fig. 10 is an enlarged longitudianal sectional view through a clutch device provided as a part of the mechanism for raising and lowering the bed.
Figure 11:
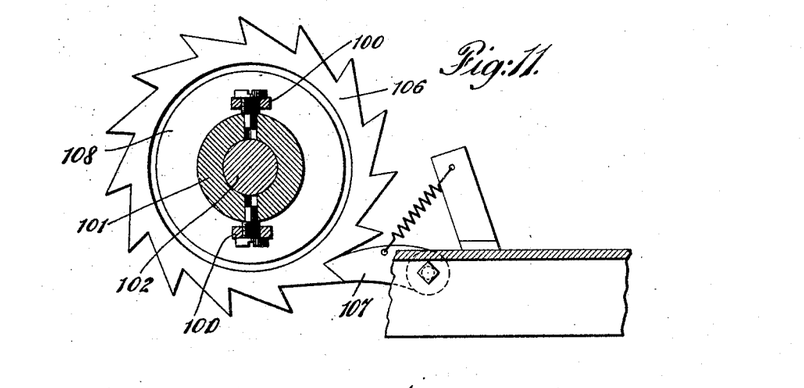
Fig. 11 is a transverse sectional view taken upon the plane of line XI—XI of Fig. 10.
Figure 12:
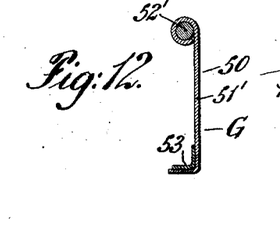
Fig. 12 is a detail sectional view of one of the side members of the bed.

The means of attaching the control cable or chain 69 with the bed comprises a safety element as most clearly illustrated in Fig. 7. This consists of a pair of toggle levers as 74—74 which are pivotally connected together at one end by a pivot pin 75, which also connects said levers with the lower end of the chain 69. A tension spring 76 has its upper end connected with the lower end of the chain and its lower end engaged about a cross pin 77 which is fixed between the cross member 67 and the bracket piece 78 carried by the flange 66 of cross member 64.

Connected with the bracket piece 78 is a standard 79 at the upper end of which is a slot 80 along which the pivot pin 75 is arranged to slide under possible contraction and extension of the spring 76.

The levers 74 extend diagonally downwardly from the pivot pin 75 to the opposite ends of cross member 67 and the outer ends of the levers having sliding engagement within guides 81—81 and are so arranged that in the event of contraction of the spring 76 they would be forced outwardly away from each other for engaging the teeth of rack bars 82—82 which are formed upon the standards 1 and 2 to receive them.

Accordingly, in the event of breakage of the chain 69, which would remove the strain holding the spring 76 extended, the levers would be instantly projected outwardly by the spring and serve to positively hold the bed against falling.

The chain or cable 69 extends upwardly from the bed over a pulley 83, thence backwardly over an idler 84 and the counter-weight H is attached to its opposite end.

The counter-weight H may be made up in any desired form but preferably consists of a pair of side plates 85 and 86 which extend for substantially the full width between the corner angles 21 and 22 of the cabinet and carry at their ends suitable flanged rollers as 87—87 for rolling along the inner edges of said corner angles to guide the counter-weight.

Intermediate these plates are arranged other plates as 88—88 for desirably increasing the weight of the counter-weight. The plates 88 are arranged in pairs spaced apart so as to provide a central space within which is located a pair of toggle levers 89—89 similar to the levers 74—74, said levers 89—89 being connected together and to the end of the cable or chain by a pivot pin 90, and co-operating with a tension spring 91, and having their opposite ends slidable for engaging racks 92—92 in the same manner and for the same purpose as described with reference to the other counter-weight, that is to say, that in the event of breakage of the cable or chain 69 the levers 89—89 would instantly move outwardly into engagement with the rack bars 92 and support the counter-weight against falling.

While the bed may be readily manually moved up and down by manual effort applied directly to the bed it is preferable however to provide a suitable handle appropriately connected to accomplish this result, and to this end a rotary handle 93 is shown herein operating through appropriate mechanism to move the bed either upwardly or downwardly according to the direction of the rotation of the handle.

The handle 93 is mounted in a bearing 94 preferably at the right hand side of the cabinet and has connected therewith a sprocket wheel 95 over which engages a sprocket chain 96, said chain extending upwardly and about a second sprocket wheel 97 arranged co-axially with the pulley 83, said sprocket wheel 97 being carried upon a shaft 98 so that said shaft may be readily rotated backwardly or forwardly by corresponding rotation of the handle.

The shaft 98 carries a yoke member 99 providing a pair of arms 100—100 which extend longitudinally in the direction of the shaft beyond the end of the shaft and into fixed engagement with a sleeve member 101, said sleeve member being loosely rotatable upon a separate shaft as 102 which is mounted in bearings 103—103 to stand co-axial with the shaft 98, said shaft 102 having the pulley 83 rigidly connected therewith.

Mounted upon the shaft 102 is a second sleeve member as 104 similar to the sleeve member 101 but being fixed to the shaft as by means of a locking pin 105. Between the sleeve members 101 and 104 is arranged a ratchet wheel 106 mounted to rotate loosely with respect to the shaft 102 but being held by a pawl 107, which engages the teeth thereof, against rotation in one direction.

The direction in which the ratchet wheel 106 is permitted by its pawl to rotate is the direction in which it would move when the bed is being lifted, the pawl being effective to prevent it from rotating in the direction in which it would endeavor to rotate when the bed is being lowered.

Each of the sleeves 101 and 104 is provided with an enlarged annular portion as 108—108 providing flat clutch faces 109—109 opposed to each other and arranged to engage against opposite flat surface portions of the interposed ratchet wheel.

Fixed to the shaft 102 is also a collar 110 said collar being arranged between the yoke arms 100—100 carried by the shaft 98 and in the space between the sleeve 101 and the end of said shaft 98. This collar has its annular edge which is opposed to the annular edge of the sleeve 101 in rubbing engagement with the annular edge of the sleeve, and the two opposing surfaces are inclined as at 111 and provided with resultant opposing shoulders as 112—112 said parts being arranged and adapted so that when the shaft 98, and with it the sleeve 101, is rotated in a direction to lift the bed the sleeve 101 and collar 110 will be cammed away from each other while when the shaft 98 is rotated in the opposite direction the sleeve and collar will be allowed to move toward each other and bring shoulders 112—112 together.

By this arrangement it follows that by rotating the handle 93 for lifting the bed the consequent initial movement of shaft 98 will cause a slight separation of the sleeve 101 and collar 110 sufficient to press the clutch faces 109—109 against the interposed ratchet wheel and thus effect a driving connection between the shafts 98 and 102 whereby the continued rotation of shaft 98 will drive the shaft 102 for lifting the bed, it being noted here that the pulley 83 is provided with suitable gripping teeth or the like as 113 by which it is enabled to positively drive the cable or chain 69, that is said gripping teeth are intended to prevent any slippage of the chain or cable about said pulley.

When the handle 93 is rotated in the opposite direction for lowering the bed the consequent change of direction of rotation of shaft 98 will be initially felt by the sleeve 101 and, as a result of the inclined or cam engagement between said sleeve and collar 110 will cause said sleeve to ease away from the ratchet wheel 106 and bring the opposing shoulders 112—112 of the sleeve and collar together so that continued rotation of the shaft 98 will drive the shaft 102 for lowering the bed without requirement for rotation of the ratchet wheel 106.

And now it will be apparent that any tendency of the bed itself to move downwardly, as for instance when an unusual weight is applied on it in the way of extra pillows, mattresses, or otherwise, will be prevented by the mechanism described, that is to say that the effort of the shaft 102 to rotate in a direction for lowering the bed will be applied by the collar 110 as a force for moving the sleeve 101 toward the sleeve 104. This will grip the ratchet wheel and since the ratchet wheel can not turn in that direction the rotation of the shaft will be prevented. And the stronger the force applied tending to rotate the shaft the greater will be the grip upon the ratchet wheel so that undesirable downward movement of the bed in the manner referred to is positively prevented.

The effectiveness of this guard against downward movement of the bed may even be considered to extend to the emergency of possible detachment of the counter-weight at any time since the loss of the counter-weight would merely have the effect of applying added weight to the bed.

As a further precaution against possible unintentional movement of the bed away from either of its extremes it is proposed to provide a pair of simple manually operable latches 114 and 115. The latch 114 is mounted adjacent the upper end of the standard 2 and is adapted to engage beneath the adjacent side member 50 of the bed for holding the bed in its upper position while the latch 115 is mounted upon the standard 2 adjacent the lower end of said standard and is adapted for engaging the side member 50 of the bed for holding the bed in its lower position. Each of these latches is provided with a spring as 116 for holding it in a normal position against a suitable stop 117, the latch 114 being furnished with a pull chain 118 by which it may be readily operated notwithstanding its elevated position, and the latch 115 being provided with an operating handle 119.

From the above description it will be apparent that I have provided a ceiling bed which combines into a single unit not only the bed proper but also other practically indispensable features of furniture for a bed room, such as a closet, a bureau or chiffonier, a dressing table, a desk, shelf space, etc. And it is apparent that if desired the cabinet part of the structure might be formed to include a china closet, a kitchen cabinet, or other features which might be preferable in case the device is to be used as an article of furniture in a dining room or kitchen.

In so combining all of these features I have greatly economized in the use of floor space, and yet I have provided means by which the bed proper is at all times maintained in a horizontal position, thus eliminating the necessity for any mattress clamps or other devices which are usually required for bed structures in which the bed proper is designed to be swung in turned on edge.

The device here described may be manufactured as a single article of furniture and placed in any room desired, without requirement for any special features of wall construction in the room. By arranging simple wood fillers 120—120 between the upper rear end of the cabinet and the ceiling all possibility of over-balancing of the cabinet will be avoided.

The standards upon which the bed is directly mounted and along which the bed slides at all times are so incorporated into the cabinet structure as to constitute elements of ornamentation upon the cabinet, and the entire operating mechanism of the device is guarded and concealed.

If desired a suitable canvas or other covering medium as 121 may be arranged beneath the springs for concealing the springs and presenting a proper appearance when the bed is in its elevated position.

As many changes could be made in this construction without departing from the scope of the invention as defined in the following claims, it is intended that all matter contained in the above description or shown in the accompanying drawings, shall be interpreted as illustrative only and not in a limiting sense.

A simple form of enclosing canopy, as 122, may be arranged at the ceiling for receiving and obscuring the bed structure when the bed is in its elevated position.

In some instances it may be preferable, instead of utilizing this canopy, to provide a recess in the ceiling to accommodate the bed and the upper portion of the cabinet in a position so that the bottom surface of the bed will occupy a plane more nearly in common with plane of the ceiling.

The downwardly extending members 60 from the sides of the bed may if desired constitute legs at the head of the bed to rest upon the floor when the bed is in its lowered position. Owing to the cantilever construction of the side members of the bed no legs whatever are shown, or desirable, at the foot of the bed, it being intended that the tension at the upper edges of the bed side members, resulting from the "cantilever beam action" of imposed load shall be largely neutralized or offset by the compressive action resulting from a load imposed and held in suspension on the bed springs.

The various special features, such as the bureau, desk, etc. may if desired be built as separate entities and adapted to be attached in position within the metallic framework of the cabinet, as in this way the special features installed may be suitable for either typical bed room use, or typical dining room use, or kitchen use, etc.

In the manufacture of this article the cabinet structure and the bed proper may be made up as separate entities and the bed be assembled in operative position only after the cabinet has been properly set. For this purpose it is intended that the upwardly extending members 54, and the rollers 55 and 57 carried thereby shall be detachable to permit the introduction of the head ends of the bed side members into position through the slots 15 and 20 whereupon the rollers and their carrying parts may be attached as by means of suitable fastening means 123 illustrated. Access to the interior portion of the cabinet for these parts may be provided by side doors such as that indicated 41 in the drawings.

Having thus described my invention, what I claim as new and desire to secure by Letters Patent is:—

1. In a device of the class described, comprising a bed, means by which the bed is mounted for bodily up and down movement, a counter-weight for the bed, a cable device connecting the bed with the counter-weight and operating means engaging the cable by which to move the cable for thereby raising and lowering the bed, the combination therewith of parts comprised in said operating means effective to prevent lowering of the bed except as the result of an operation of said operating means, means to prevent downward movement of the counter-weight in the event of failure of the cable, and a portable support for all of said parts with the bed at one side thereof and the counter-weight at the opposite side thereof whereby the whole constitutes a unitary portable article of furniture.

2. A device of the class described comprising a bed, supporting means by which the bed is mounted for bodily up and down movement, a counter-weight for the bed, a cable device connecting the bed with the counter-weight, operating means engaging the cable by which to move the cable for thereby raising and lowering the bed, a latch adjacent the lower end of said supporting means for interengaging between the bed and said supporting means when the bed is in its lowermost position to hold the bed in said lowermost position, a handle by which to release said latch, a second latch adjacent the upper end of said supporting means when the bed is in its uppermost position to hold the bed in said uppermost position, and an operating device for said second latch depending downwardly therefrom to a position of accessibility adjacent the first latch.

3. A portable article of furniture comprising a cabinet structure providing storage space interiorly thereof and providing substantially vertical guide-ways at the front and rear of said storage space, a sleeping bed movable along one of said guide-ways into and out of a position of use, and a counter-weight for said bed connected therewith and movable along the other guide-way.

4. A device of the class described, in combination a horizontally disposed sleeping bed, a portable carrier for said bed adapted to rest upon the floor and providing a vertical guide-way along which the bed is adapted to travel into and out of a position of use while maintaining its horizontal position, the bed being arranged with one end thereof adjacent the carrier and the remainder of the bed at all times projecting away from the carrier, rollers connected with the bed at the mentioned end thereof engaging said guide-way to facilitate movement of the bed along said guide-way, a counter-weight also carried by the carrier, a single cable extending from said mentioned end of the bed to said counter-weight whereby the weight of the bed is balanced by the counter-weight, and the counter-weight being spaced from the floor engaging portion of the carrier and at the side of the carrier opposite the bed, whereby to balance the carrier against tendency to tilt toward either the bed or the counter-weight.

5. A device of the class described, comprising a horizontally disposed sleeping bed, means whereby said bed is mounted for bodily vertical movement into and out of a position of use while maintaining its horizontal position, said means comprising a stationary vertical standard disposed at one end of the bed providing one guide-surface facing toward the bed and an opposite guide-surface facing away from the bed, the bed having a part movably engaging the face of the standard toward said bed, the bed having a second part spaced above the first part and movably engaging the face of the standard which is directed away from the bed, said two mentioned parts of the bed being in fixed relation to each other and to the bed whereby to support the opposite end portion of the bed by means of said standard during movement of the bed along the standard, the bed including a frame member extending longitudinally from end to end thereof having said mentioned guide-way engaging parts fixed to one of its ends, and said frame member having a tension element extending along the length of its upper edge, a compression element extending along the length of its lower edge and an intermediate web portion connecting said tension and compression elements and spacing said elements apart.

6. A device of the class described, comprising a horizontally disposed sleeping bed, means whereby said bed is mounted for bodily vertical movement into and out of a position of use while maintaining its horizontal position, said means comprising a stationary vertical standard disposed at one end of the bed providing one guide-surface facing toward the bed and an opposite guide-surface facing away from the bed, the bed having a part movably engaging the face of the standard toward said bed, the bed having a second part spaced above the first part and movably engaging the face of the standard which is directed away from the bed, said two mentioned parts of the bed being in fixed relation to each other and to the bed whereby to support the opposite end portion of the bed by means of said standard during movement of the bed along the standard, the bed including a frame member extending longitudinally from end to end thereof having said mentioned guideway engaging parts fixed to one of its ends, said frame member having a tension element extending along the length of its upper edge, a compression element extending along the length of its lower edge and an intermediate web portion connecting said tension and compression elements and spacing said elements apart, and a tension spring connecting opposite end portions of said frame member disposed adjacent to the tension element thereof and adapted to receive and be tensioned by a superposed weight applied to the bed to thereby partially relieve tensional strain upon said tension element in the presence of said weight.

7. A portable article of furniture comprising a cabinet structure providing storage space interiorly thereof and providing guide-ways at the front and rear of said storage space, a sleeping bed movable along one of said guide-ways into and out of a position of use, a counter-weight for said bed connected therewith and movable along the other guide-way, an auxiliary article of furniture, and means whereby said auxiliary article of furniture is supported in said space in position to constitute a wall part of said cabinet structure.

8. A portable article of furniture comprising a cabinet structure providing storage space interiorly thereof and providing guide-ways at the front and rear of said storage space, a sleeping bed movable along one of said guide-ways into and out of a position of use, a counter-weight for said bed connected therewith and movable along the other guide-way, and an auxiliary article of furniture arranged in said space obstructed by the bed when the bed is in position of use but accessible when the bed is moved out of its position of use.

In testimony whereof I affix my signature.

THORNTON W. PRICE.